United States Patent [19]
Cheung et al.

[11] Patent Number: 6,153,955
[45] Date of Patent: Nov. 28, 2000

[54] IMPLEMENTING COMPREHENSIVE PID ENGINE WITH SINGLE BIT ADDER

[75] Inventors: Chong-Hing Cheung, Mission Viejo; Hua Peng, Irvine, both of Calif.

[73] Assignee: Conexant Systems, Inc., Newport Beach, Calif.

[21] Appl. No.: 09/283,175

[22] Filed: Apr. 1, 1999

[51] Int. Cl.[7] .................................................. H02K 41/00
[52] U.S. Cl. ........................................ 310/68 R; 318/38
[58] Field of Search ........................... 318/38; 310/68 R; 399/36

[56] References Cited

U.S. PATENT DOCUMENTS 5,629,574  5/1997  Cognetti et al. ........................... 310/71

*Primary Examiner*—Nick Ponomarenko
*Assistant Examiner*—Judson H. Jones
*Attorney, Agent, or Firm*—Akin, bump, Strauss, Hauer & Fez

[57] ABSTRACT

A digital image printer that performs certain digital image processing functions using parallel integrated circuitry and other functions using serial integrated circuitry in an effort to minimize integrated circuit real estate. The serial integrated circuitry is allocated to certain functions within digital image printing system that perform various mechanical operations. The inherent mechanical time constant of these mechanical operations, when compared to electrical digital image processing operations performed using modern integrated circuitry, is relatively long. In other words, the mechanical operations are performed in a relatively longer time than is made possible using modern integrated circuitry and processors employed within digital image printing systems. The present invention dedicates certain of the functions used to perform digital image processing to be performed using slower, serial integrated circuitry. While this serial digital image processing is slow when compared to parallel digital image processing, there are advantages in the particular context of digital image printing systems, in that, serial processing integrated circuitry takes up significantly less space on an integrated circuit. Also, serial processing integrated circuitry is very easily scaleable to accommodate any variety of digital image printing systems having various mechanical and electrical characteristics. A very small size integrated circuit is achieved by dedicating serial processing integrated circuitry to a certain number of the total functions that must be performed in the digital image printer. Significant cost savings are also achieved given the greatly reduced size of the integrated circuit.

20 Claims, 6 Drawing Sheets

IMPLEMENTING COMPREHENSIVE PID ENGINE WITH SINGLE BIT ADDER

INCORPORATION BY REFERENCE

The following applications are hereby incorporated herein by reference in their entirety and made part of the present application:

1) U.S. patent application Ser. No. 09/282,956, filed Apr. 1, 1999;
2) U.S. patent application Ser. No. 09/282,949, filed Apr. 1, 1999;
3) U.S. patent application Ser. No. 09/283,876, filed Apr. 1, 1999.

BACKGROUND

1. Technical Field

The present invention relates generally to digital image data processing; and, more particularly, it relates to digital image printing.

2. Description of Related Art

Conventional digital image printing systems, in that they commonly employ parallel image data processing to image data throughout the digital image printing system, inherently require a significant dedication of real estate within its integrated circuitry. For example, for a digital image printing system that can accommodate a wide variety of image data having varying data sizes. Within digital image printing system that perform mechanical operations such as ink jet printer nozzle movement and translation, the processing circuitry of the digital image printing system may be left idle while during the performance of the mechanical operations. The time inherently required to execute the mechanical steps, when compared with the time required to perform digital image data processing using modern processors, is relatively long. Digital image data processing circuitry is often left idle due to the large time mismatches between the various component electrical and mechanical response times.

Another undesirable characteristic in digital image printing system that employ parallel processing is the large amount of real estate within an integrated circuit that must be dedicated to accommodate the parallel processing circuitry for a variety of functions. This large dedication of integrated circuitry real estate is undesirable, especially for those digital image data processing functions whose processing circuitry remains idle during the performance of mechanical operations within the digital image printing system. Additionally, the cost of integrated circuitry is undesirably increased as more and more silicon is used to perform all image data processing functions in a parallel processing manner. This large dedication of parallel processing circuitry, for each of the possible digital image printing systems in which the image processing circuitry may be installed, greatly increases the size, and therefore the cost, of an integrated circuit used to perform these image data processing functions, as described above.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in control circuitry employed within a printer. A digital image printer chipset that is capable of operating within multiple digital image printing systems irrespective of the physical, mechanical, and electrical characteristics of the digital image printer. The digital image printer chipset allocates certain functional operations to be performed using parallel processing circuitry and other functional operations to be performed using serial processing circuitry.

In certain embodiments of the invention, the digital image printer chipset is implemented in an ink jet digital image printer. Certain mechanical operations that must be performed within ink jet digital image printers operate with significantly slower response times than digital image data processing operations using modern technology employing primarily parallel processing circuitry. Efficient allocation of certain functions within the printer is performed using serial processing circuitry borrowing on the slower response time of the mechanical operations of the ink jet digital image printer. Other functions are performed using the parallel processing circuitry. This allocation provides efficient digital image data processing of the overall processing circuitry employed within the printer. This allocation easily responds to the various characteristics of the particular digital image printing system, namely, the specific components, the different circuitry and hardware, and the different data management of the particular digital image printing system. For example, within ink jet digital image printing systems, these varying characteristics include, among other things, number of ink jet nozzles, the mechanical separation between the ink jet nozzles, the number of ink jet nozzles that are fired at any given time, and the firing order of the ink jet nozzles.

In certain embodiments of the invention, the digital image printer chipset is within a printer that is contained within a multi-functional peripheral. The multi-functional peripheral device is a peripheral device containing a plurality of internal devices wherein each of the devices operates either independently or cooperatively to process the plurality of image data. Alternatively, the digital image printer chipset is within a printer that is contained within a stand alone device performing primarily digital image printing. The stand alone device interfaces with additional peripheral devices, including a computing device, if desired.

Other aspects, advantages and novel features of the present invention will become apparent from the following detailed description of the invention when considered in conjunction with the accompanying drawings.

DETAILED DESCRIPTION OF DRAWINGS

Figure 1:
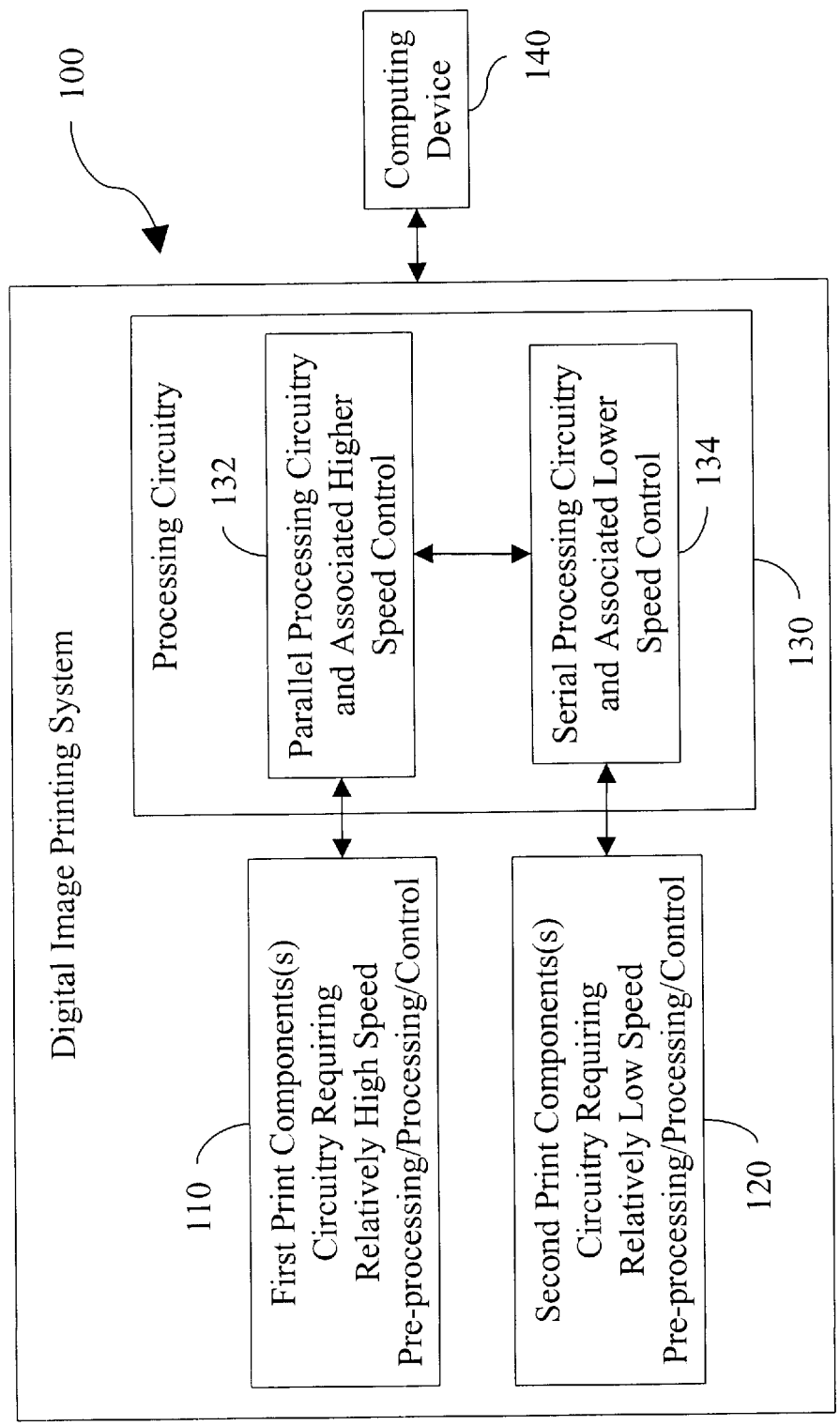
FIG. 1 is a functional block diagram of a digital image printer having parallel processing circuitry and serial processing circuitry for performing functions requiring higher and lower speed processing illustrating one embodiment of the present invention.

FIG. 1 is a block diagram of digital image printer 100 having processing circuitry 130 that contains both parallel processing circuitry and associated higher speed control 132 and serial processing circuitry and associated lower speed control 134 for performing functions requiring higher and lower speed processing illustrating one embodiment of the present invention. First print component(s) circuitry requiring relatively high speed preprocessing/processing/control 110 and second print component(s) circuitry requiring relatively low speed preprocessing/processing/control 120 are contained within the digital image printer 100. The first print component(s) circuitry requiring relatively high speed preprocessing/processing/control 110 operate cooperatively with the parallel processing circuitry and associated higher speed control 132. The second print component(s) circuitry requiring relatively low speed preprocessing/processing/control 120 operate cooperatively with the serial processing circuitry and associated lower speed control 134. The digital image printer 100 interfaces with a computing device 140. The interfacing between the digital image printer 100 and the computing device 140 is performed using any means known in the art for communicatively coupling, transmitting and receiving digital image data. In certain embodiments of the invention, the computing device 140 communicates with the digital image printer 100 via a communication link thereby permitting the provision of image data from a wide variety of sources. The digital image printer 100 is inherently capable of adapting to and operating across multiple platforms of digital image printing systems.

Figure 2:
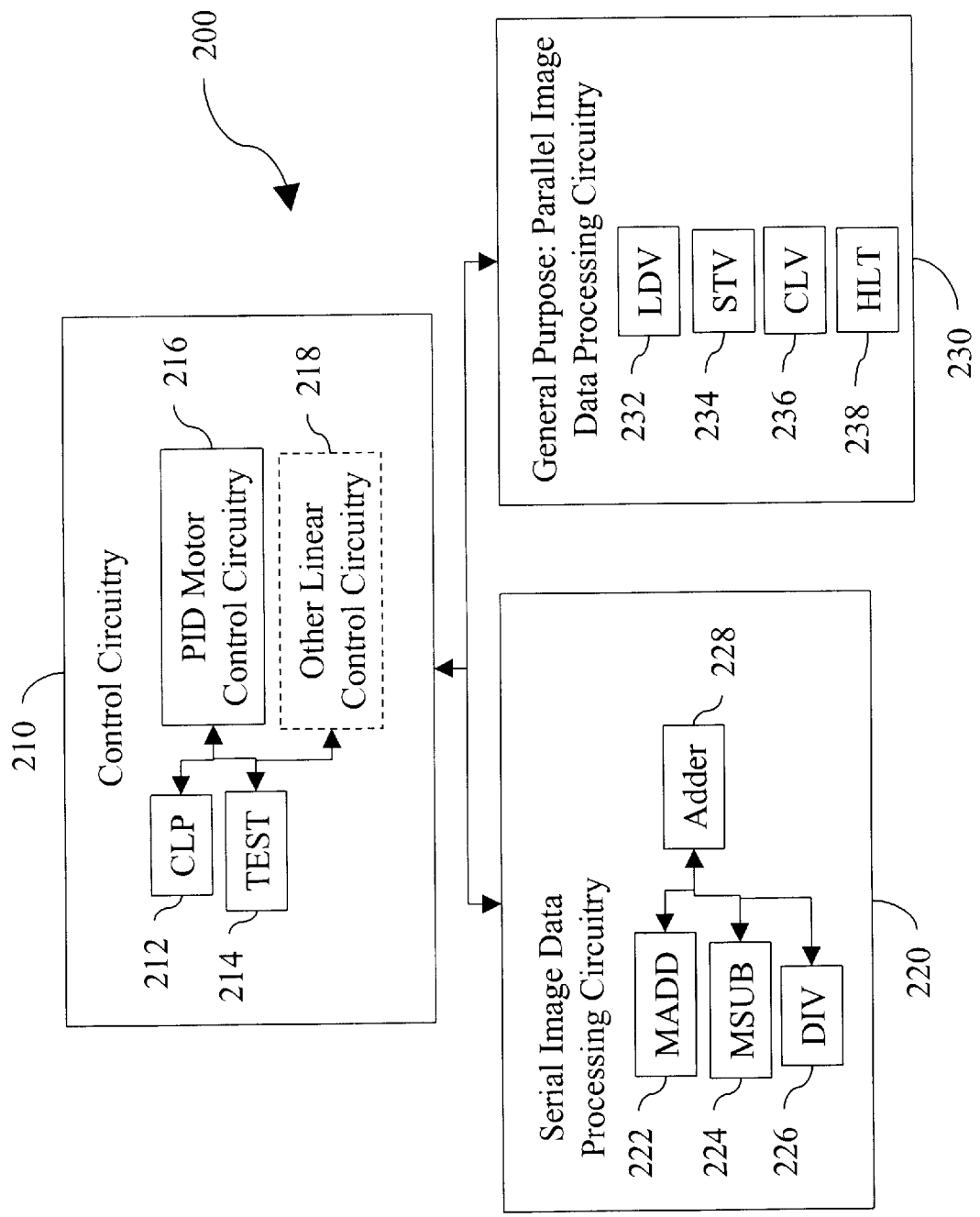
FIG. 2 is a block diagram of a digital image printer having parallel processing circuitry, serial processing circuitry, and control processing circuitry illustrating one specific embodiment of the digital image printer of FIG. 1.

FIG. 2 is a a block diagram of digital image printer 200 having parallel image data processing circuitry 230, serial image data processing circuitry 220, and control processing circuitry 210 illustrating one specific embodiment of the digital image printer of FIG. 1. The digital image printer 200 allocates certain functions to be performed using the parallel image data processing circuitry 230 and other functions to be performed using the serial image data processing circuitry 220. In the specific embodiment shown in FIG. 2, the serial image data processing circuitry 220 contains several internal components. A multiply accumulate (MADD) 222 function, a multiply subtract (MSUB) 224 function, a divide (DIV) 226 function, and a single adder 228 are all performed using the serial image data processing circuitry 220. The use of the single adder 228 to perform the multiply accumulate (MADD) 222, the multiply subtract (MSUB) 224 function, a divide (DIV) 226 functions results in a significant real estate savings in the serial image data processing circuitry 220. The control processing circuitry 210 contains several internal components. A vector clip (CLP) 212 function, a sign test (TEST) 214 function, and proportional, integral, and differential (PID) motor control circuitry 216 are all contained within the control processing circuitry 210. Any other linear control circuitry 218 is also included to perform any linear control function as required in the digital image printer 200. Similarly, the parallel image data processing circuitry 230 contains several internal components. A vector loading (LDV) 232 function, a vector storing (STV) 234 function, a vector clearing (CLV) 236, and a halt or stop (HLT) 238 are all implemented using general purpose parallel integrated circuitry, namely, the parallel image data processing circuitry 230.

Figure 3:
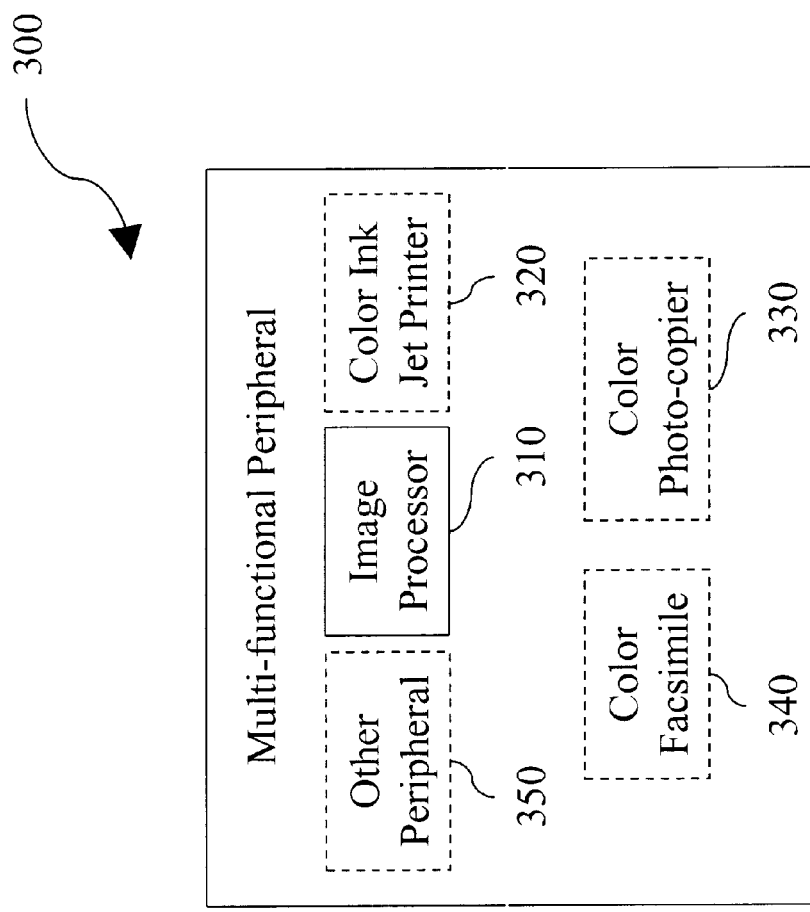
FIG. 3 is a functional block diagram of multi-functional peripheral that contains an image processor illustrating one embodiment of the present invention.

FIG. 3 is a a block diagram of multi-functional peripheral 300 that contains an image processor 310 illustrating one embodiment of the present invention. In certain embodiments, additional peripheral devices are included in the multi-functional peripheral 300. The multi-functional peripheral 300 contains any number of devices that cooperatively perform processing using the image processor 310 to prepare image data in a form suitable for printing or display that is of a high visible perceptual quality. Examples of such devices include color photo-copy machines, color facsimiles, color printers, black and white printers, and digital printers.

In certain embodiments of the invention, the multi-functional peripheral 300 contains several of the devices described above. In certain embodiments of the present invention, a color ink jet printer 320 is included in the multi-functional peripheral 300. In other embodiments, a color photo-copier 330 and a color facsimile 340 are both contained in the multi-functional peripheral 300 thereby providing multiple functions all within a single device. Those having skill in the art will recognize that any other peripheral 350 could be similarly included in the multi-functional peripheral 300 without departing from the scope and spirit of the invention. In certain embodiments, the multi-functional peripheral 300 provides a system in which various devices serve one another in receiving data in one form and converting it into another for appropriate display, reproduction, or transmission. In certain embodiments, the color photo-copier 330 converts a plurality of image data 510 to a plurality of image data for display/print 1030 that is suitable for display or printing (See FIG. 5). The plurality of image data 510 is then input into the color facsimile 340 wherein it is viewed or reproduced as the plurality of image data 530. The color facsimile 340 performs converts the plurality of image data 510 to a form suitable for transmission on the communication link 290 (See FIG. 2). Those having skill in the art will recognize that the image data addressing system 100, as described in FIG. 1, is contained within the multi-functional peripheral 300 in many of the various embodiments of the invention.

Figure 4:
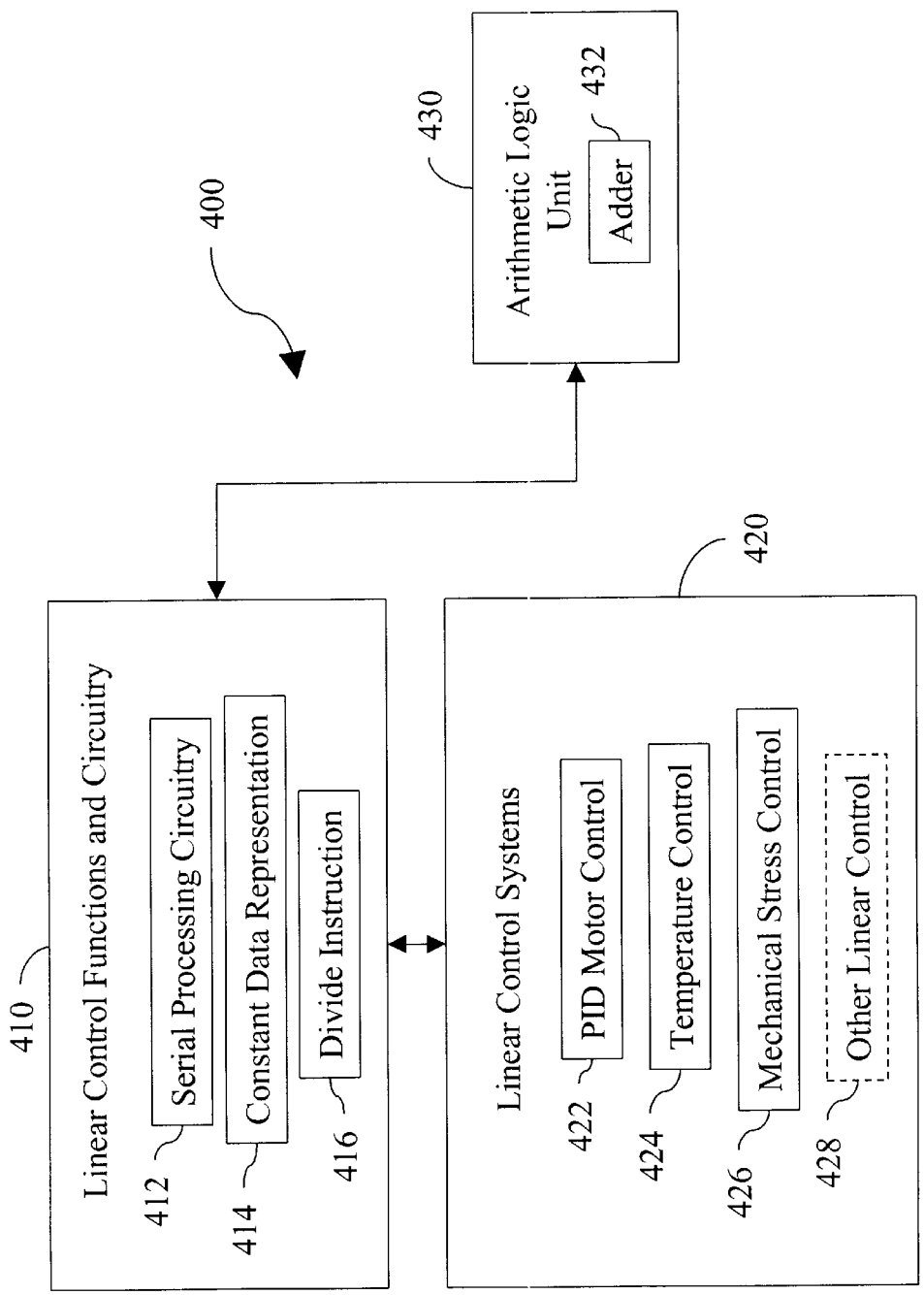
FIG. 4 is a functional block diagram of a digital image printer illustrating a specific embodiment of any one or more of the digital printer systems of FIGS. 1, 2 or 3.

FIG. 4 is a block diagram of digital image printer 400 illustrating a specific embodiment of any one or more of the digital image printing systems of FIGS. 1, 2 or 3. Linear control functions and circuitry 410 are all combined in an effort to create a proportional, integral, and differential (PID) method of control a PID motor within the digital image printer 400. Serial processing circuitry 412 is used to perform digital image data processing within the linear control functions and circuitry 410. Great real estate savings is achieved by performing constant data representation 414 and a divide instruction 416 in the dedicated integrated circuitry used within the linear control functions and circuitry 410. An arithmetic logic unit 430 is used to perform the mathematical operations of the linear control functions and circuitry 410. As described above in the specific embodiment of the digital image printer 200 of FIG. 2, a single adder 432 is similarly used for several functions within the digital image printer 400. A plurality of linear control systems 420 are performed using the digital image printer 400. A proportional, integral, and differential (PID) motor control 422 function is provided. Similarly, a temperature control 424 function, and a mechanical stress control 426 function are performed. Any other linear control 428 function is shown in FIG. 4. Those having skill in the art will appreciate that the digital image printer 400, in that it is capable of operating as a linear control system for proportional, integral, and differential (PID) motor control 422, it may be adapted to the any other linear control 428 to accommodate additional linear control functions within the digital image printer 400.

Figure 5:
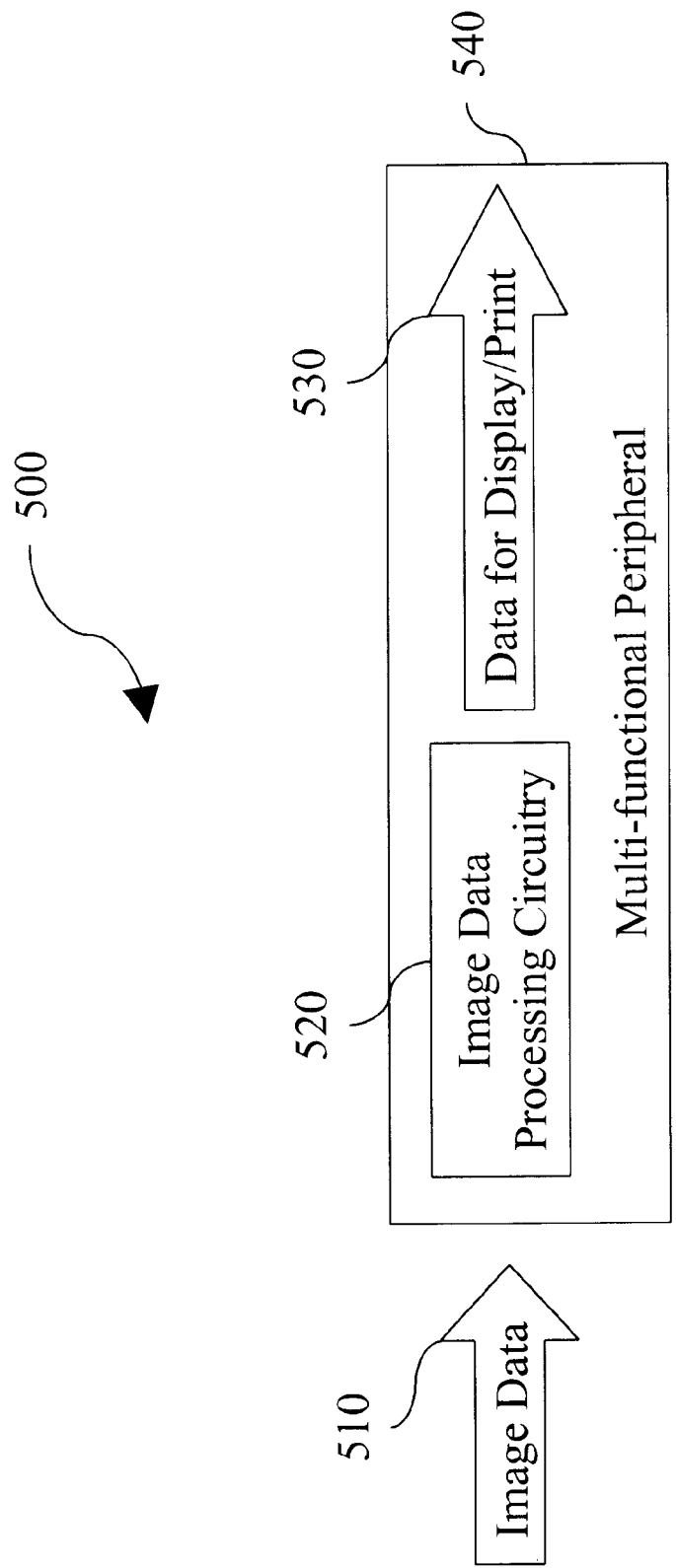
FIG. 5 is a flow diagram of a multi-functional peripheral illustrating one specific embodiment of the present invention that performs image data processing to make a plurality of image data suitable for displaying or printing.

FIG. 5 is a flow diagram of a multi-functional peripheral 540 illustrating one specific embodiment 500 of the present invention that performs image processing to make a plurality of image data 510 suitable for displaying or printing, i.e., into a plurality of image data for display/print 530. In certain embodiments of the invention, the multi-functional peripheral 540 is the multi-functional peripheral 300 as described in FIG. 3. The multi-functional peripheral 540 contains image data processing circuitry 520 that is used to process a plurality of image data 510. The multi-functional peripheral 540 converts the plurality of image data 510 into the plurality image data for display/print 530. The plurality image data for display/print 530 is in a form suitable for printing on color ink jet printers in certain embodiments of the invention. In other embodiments, it is in a form suitable for laser printers. In certain embodiments of the invention, the processing circuitry 520 is the image processor 310 as described in FIG. 3. In other embodiments, it is internal processing resources contained within any of the devices contained within the multi-functional peripheral 300 of FIG. 3 including the other peripheral 350.

Figure 6:
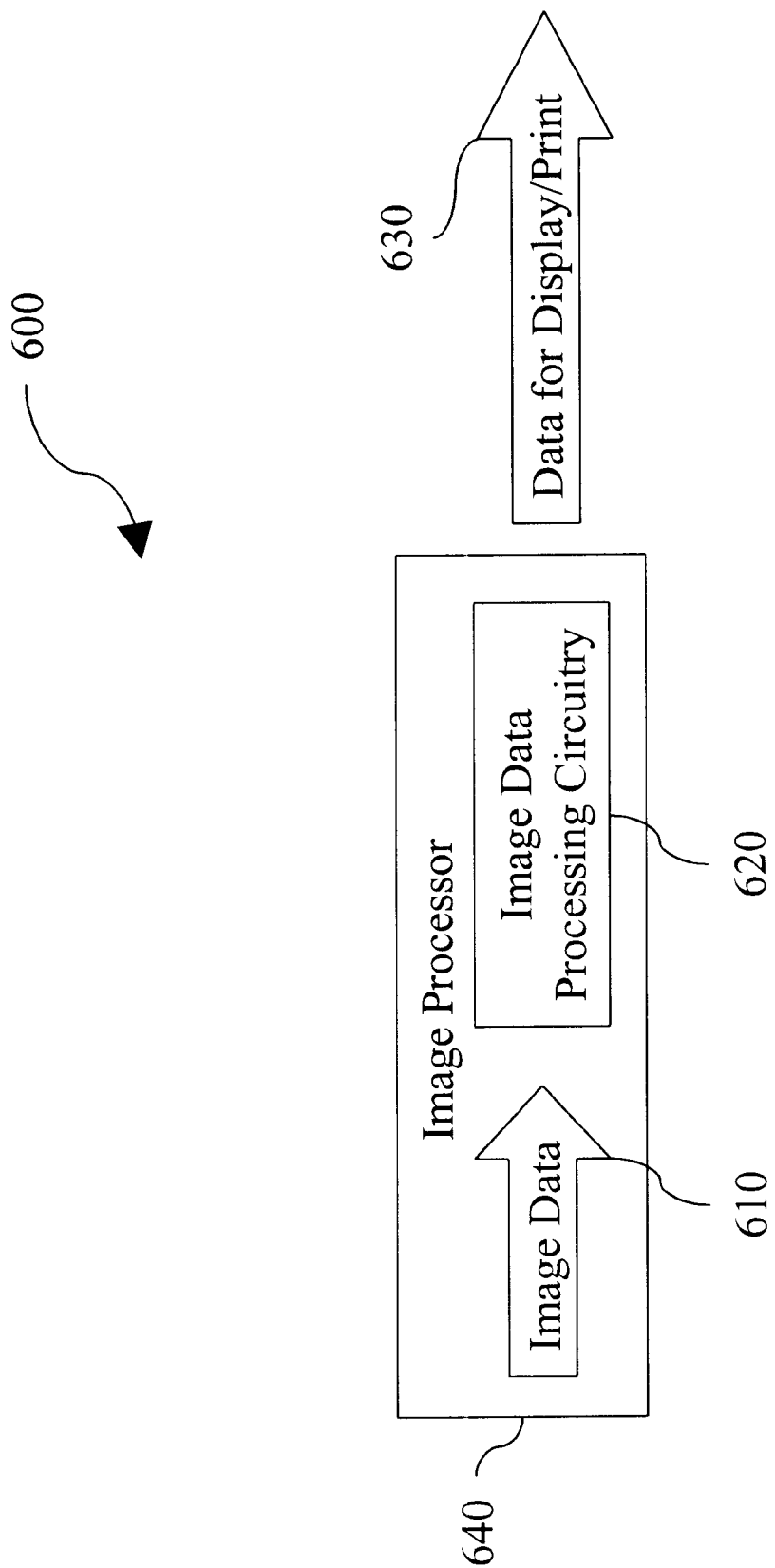
FIG. 6 is a flow diagram of an image processor illustrating one specific embodiment of the present invention that performs image data processing to make a plurality of image data suitable for displaying or printing.

FIG. 6 is a flow diagram of an image processor 640 illustrating one specific embodiment 600 of the present invention that performs image processing to make a plurality of image data 610 suitable for displaying or printing, i.e., into a plurality of image data for display/print 630. The image processor 640 contains image data processing circuitry 620. In certain embodiments, the image processor 640 is substantially the same as the image processor 310 as described in the multi-functional peripheral 300 of FIG. 3. The image data processing circuitry 620 is used to process the plurality of image data 610 into the plurality of image data for display/print 630. In certain embodiments of the invention, the image processor 640 is a processing system internal to any of the devices contained within the multi-functional peripheral 300 of FIG. 3 including the other peripheral 350.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. Printer control circuitry used to perform a plurality of printer functions, the control circuitry comprising:

a parallel processing circuit that performs a first portion of the plurality of printer functions;

a printer component requiring relatively low speed interaction;

a serial processing circuit that performs a second portion of the plurality of printer functions; and the second portion of the plurality of printer functions interacting with the printer component.

2. The printer control circuitry of claim 1 wherein the printer component comprises a motor.

3. The printer control circuitry of claim 2 wherein the motor only requires brief periods of interaction with relatively long time intervals separating each of the periods of interaction.

4. The printer control circuitry of claim 2 wherein the plurality of printer functions comprises a proportional integral derivative algorithm used to control the motor.

5. The printer control circuitry of claim 1 wherein the serial processing circuit uses a relatively low transistor count which operates at a relatively slow speed, and the parallel processing circuit has a relatively high transistor count which operates at a relatively fast speed.

6. The printer control circuitry of claim 1 wherein the serial processing circuit comprises a single bit adder.

7. The printer control circuitry of claim 1 wherein the serial processing circuit performs a multiply function.

8. Printer control circuitry used to perform a plurality of printer functions, the control circuitry comprising:

at least one printer component that operates at a relatively slow rate;

a first processing circuit, having a relatively low transistor count that operates at a relatively slow speed, that performs a first portion of the plurality of printer functions;

the first portion of the plurality of printer functions interfacing with the at least one printer component; and a second processing circuit, having a relatively high transistor count that operates at a relatively fast speed, that performs a second portion of the plurality of printer functions.

9. The printer control circuitry of claim 8 wherein the at least one printer component comprises a motor.

10. The printer control circuitry of claim 8 wherein the first processing circuit comprises a serial processor.

11. The printer control circuitry of claim 8 wherein the first processing circuit comprises a single bit adder.

12. The printer control circuitry of claim 10 wherein the first processing circuit performs a serial multiply function.

13. The printer control circuitry of claim 10 wherein the first processing circuit performs a serial multiply accumulate function.

14. The printer control circuitry of claim 10 wherein the first processing circuit performs a serial division function.

15. Printer control circuitry used to perform a plurality of printer functions, the control circuitry comprising:

at least one printer component that operates at a relatively slow rate;

serial processing circuitry that performs the plurality of printer functions; and the plurality of printer functions interacting with the at least one printer component.

16. The printer control circuitry of claim 15 wherein the at least one printer component comprises a motor.

17. The printer control circuitry of claim 15 wherein the serial processing circuitry comprises a single bit adder.

18. The printer control circuitry of claim 15 wherein the serial processing circuitry performs a serial division function.

19. The printer control circuitry of claim 15 wherein the serial processing circuitry performs a serial multiply function.

20. The printer control circuitry of claim 16 wherein the plurality of printer functions comprises a proportional integral derivative algorithm used to control the motor.

\* \* \* \* \*

UNITED STATES PATENT AND TRADEMARK OFFICE
CERTIFICATE OF CORRECTION

PATENT NO.    : 6,153,955
DATED         : November 28, 2000
INVENTOR(S)   : Cheung et al.

Page 1 of 1

It is certified that error appears in the above-identified patent and that said Letters Patent is hereby corrected as shown below:

<u>Title page,</u>
Attorney, Agent or Firm please delete "Akin, bump, Strauss, Hauer & Fez" and insert -- Akin, Gump, Strauss, Hauer & Feld, L.L.P. --.

<u>Page 1, column 2,</u>
Line 4, please delete "system" and insert -- systems --.

<u>Column 1,</u>
Line 28, please delete "system" and insert -- systems --.
Line 33, please delete "while".
Line 42, please delete "system" and insert -- systems --.

<u>Column 2,</u>
Line 27, please delete "number" and insert -- a number --.

Signed and Sealed this

Twenty-fifth Day of September, 2001

Attest:

*Attesting Officer*

NICHOLAS P. GODICI
*Acting Director of the United States Patent and Trademark Office*